(12) United States Patent
Thompson et al.

(10) Patent No.: US 11,584,374 B2
(45) Date of Patent: Feb. 21, 2023

(54) SYSTEM AND METHOD TO SHIFT TRANSMISSION IN MACHINES

(71) Applicant: Caterpillar Underground Mining Pty. Ltd., South Burnie (AU)

(72) Inventors: Brodie Lee Thompson, Ulverstone (AU); Sai Praveen Gundlapalli, Chennai (IN); Robert Anthony Herold, Brimfield, IL (US); Alexander Eli Dowling, Burnie (AU); Scott Glenn Jackson, Burnie (AU)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 0 days.

(21) Appl. No.: 17/332,351

(22) Filed: May 27, 2021

(65) Prior Publication Data

US 2021/0370942 A1 Dec. 2, 2021

(30) Foreign Application Priority Data

May 29, 2020 (AU) .............................. 2020203556

(51) Int. Cl.
*F16H 61/16* (2006.01)
*B60W 30/18* (2012.01)
(Continued)

(52) U.S. Cl.
CPC ...... *B60W 30/18036* (2013.01); *B60W 10/06* (2013.01); *B60W 10/10* (2013.01); *B60W 10/18* (2013.01); *B60W 50/045* (2013.01); *F16H 61/16* (2013.01); *B60W 2510/0638* (2013.01); *B60W 2510/109* (2013.01); *B60W 2520/10* (2013.01);
(Continued)

(58) Field of Classification Search
CPC .............. F16H 2061/165; F16H 61/16; B60W 30/18036; B60W 10/06; B60W 10/10; B60W 10/18; B60W 50/045; B60W 2510/0638; B60W 2520/10; B60W 2520/16; B60W 2530/10; B60W 2710/0627; B60W 2710/0644;
(Continued)

(56) References Cited

U.S. PATENT DOCUMENTS 3,913,700 A * 10/1975 James ................... B60T 11/103
180/271
3,998,191 A * 12/1976 Beyerlein ............... F02D 17/04
361/239

(Continued)

FOREIGN PATENT DOCUMENTS

CN 101809336 8/2010

*Primary Examiner* — Roger L Pang
(74) *Attorney, Agent, or Firm* — von Briesen & Roper, s.c.

(57) ABSTRACT

A method for shifting a transmission in a machine. The method includes detecting a request for a directional shift of the transmission and determining a ground speed of the machine in response to the request. The method further includes overriding the request if the ground speed is above a ground speed threshold. Further, the method includes preparing the machine for the directional shift by limiting an output speed of a power source of the machine and by issuing a command to a brake unit of the machine to reduce the ground speed of the machine. Furthermore, the method includes validating and raising the request to the transmission to execute the directional shift if the ground speed is below the ground speed threshold.

17 Claims, 3 Drawing Sheets

(51) Int. Cl.
*B60W 10/06* (2006.01)
*B60W 10/18* (2012.01)
*B60W 10/10* (2012.01)
*B60W 50/04* (2006.01)

(52) U.S. Cl.
CPC ..... *B60W 2520/16* (2013.01); *B60W 2530/10* (2013.01); *B60W 2710/0627* (2013.01); *B60W 2710/0644* (2013.01); *B60W 2710/10* (2013.01); *B60W 2710/1094* (2013.01); *B60W 2710/18* (2013.01); *F16H 2061/165* (2013.01)

(58) Field of Classification Search
CPC ............. B60W 2710/10; B60W 30/19; B60W 2710/18; B60W 30/18045
See application file for complete search history.

(56) References Cited

U.S. PATENT DOCUMENTS

| | | | |
|---|---|---|---|
| 4,243,330 | A | 2/1981 | Audiffred, Jr. et al. |
| 4,300,652 | A * | 11/1981 | Redzinski ....... B60W 30/18045 180/336 |
| 5,320,000 | A | 6/1994 | Marusue et al. |
| 6,162,146 | A | 12/2000 | Hoefling |
| 6,385,970 | B1 | 5/2002 | Kuras et al. |
| 7,097,021 | B2 * | 8/2006 | Takamura ......... B60W 30/1819 192/221 |
| 7,946,404 | B2 | 5/2011 | Nakagawa et al. |
| 8,326,499 | B2 | 12/2012 | Sopko, Jr. et al. |
| 8,386,131 | B2 * | 2/2013 | Thaduvayi .............. B60T 7/122 701/36 |
| 9,545,925 | B1 | 1/2017 | Guldan et al. |
| 11,136,011 | B2 * | 10/2021 | Pursifull ................. B60T 7/122 |

* cited by examiner

SYSTEM AND METHOD TO SHIFT TRANSMISSION IN MACHINES

CROSS-REFERENCE TO RELATED APPLICATION

This application claims priority under 35 USC § 119 and the Paris Convention to Australian Patent Application No. 2020203556 filed on May 29, 2020.

TECHNICAL FIELD

The present disclosure relates to machines, such as haul trucks and loaders, applied in underground mining environments, and, more particularly, to a system and a method that helps attain a directional shift in such machines.

BACKGROUND

A mobile machine, such as a haul truck or a wheel loader, applicable in mining and construction environments, typically includes a transmission that transfers rotational power from a power source (e.g., an internal combustion engine) of the machine to one or more traction devices of the machine. In so doing, the transmission helps attain machine motion. It is common for such transmissions to be switched between multiple speeds to suitably allow the machine to travel at different speeds and be shifted between multiple directions to allow the machine to travel in different directions.

If a directional shift of such a transmission is attempted (e.g., to switch the transmission from a first direction to an opposite, second direction) while the machine is in motion, a momentum aligned with the first direction would be dissipated before the transmission begins to move in the second direction. For example, the momentum may be dissipated to components of the transmission and to components of an associated powertrain of the machine. A component, such as a clutch, for example, that may need to be engaged to attain the second direction may slip until it is fully engaged to transmit motion in the second direction— during slipping, some friction material of the clutch may wear away. In effect, a resultant output of a directional shift may correspond to a relatively high energy event which often causes wear of several components and parts, leading to lower than expected life of the components.

U.S. Pat. No. 9,545,925 ('925 reference) relates to a transmission system that has a first clutch configured to transfer power in a first direction, a second clutch configured to transfer power in a second direction, a brake, and an interface device configured to generate a first signal indicative of a desire to shift power transfer directions. The '925 reference includes a controller that causes disengagement of the first clutch in response to the first signal, to cause the brake to apply a retarding torque to a traction device, and to determine an amount of the retarding torque being applied to the traction device. The controller also selectively transfers the retarding torque to the second clutch when a capacity of the second clutch to provide retarding torque is about equal to the amount of the retarding torque being applied by the brake.

SUMMARY OF THE INVENTION

In one aspect, the disclosure is directed to a method for shifting a transmission in a machine. The method includes detecting a request for a directional shift of the transmission and determining a ground speed of the machine in response to the request. The method further includes overriding the request if the ground speed is above a ground speed threshold. The method also includes preparing the machine for the directional shift by limiting an output speed of a power source of the machine and issuing a command to a brake unit of the machine to reduce the ground speed of the machine. Furthermore, the method includes validating and raising the request to the transmission to execute the directional shift if the ground speed is below the ground speed threshold.

In another aspect, the disclosure is related to a machine. The machine includes a power source to generate power, a transmission operably coupled to the power source to receive power from the power source and transfer the power to one or more traction devices of the machine to facilitate machine motion, a brake unit to apply braking force against the traction devices to retard machine motion, and a control system for shifting the transmission. The control system includes a controller. The controller is configured to detect a request for a directional shift of the transmission and determine a ground speed of the machine in response to the request. The controller is further configured to override the request if the ground speed is above a ground speed threshold. Also, the controller is configured to prepare the machine for the directional shift by limiting an output speed of the power source and by issuing a command to the brake unit to reduce the ground speed of the machine. Furthermore, the controller is configured to validate and raise the request to the transmission to execute the directional shift if the ground speed is below the ground speed threshold.

In yet another aspect, the disclosure is directed to a control system for shifting a transmission in a machine. The control system includes a controller. The controller is configured to detect a request for a directional shift of the transmission and determine a ground speed of the machine in response to the request. The controller is also configured to override the request if the ground speed is above a ground speed threshold. Further, the controller is configured to prepare the machine for the directional shift by limiting an output speed of a power source of the machine and by issuing a command to a brake unit of the machine to reduce the ground speed of the machine. Furthermore, the controller is configured to validate and raise the request to the transmission to execute the directional shift if the ground speed is below the ground speed threshold.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
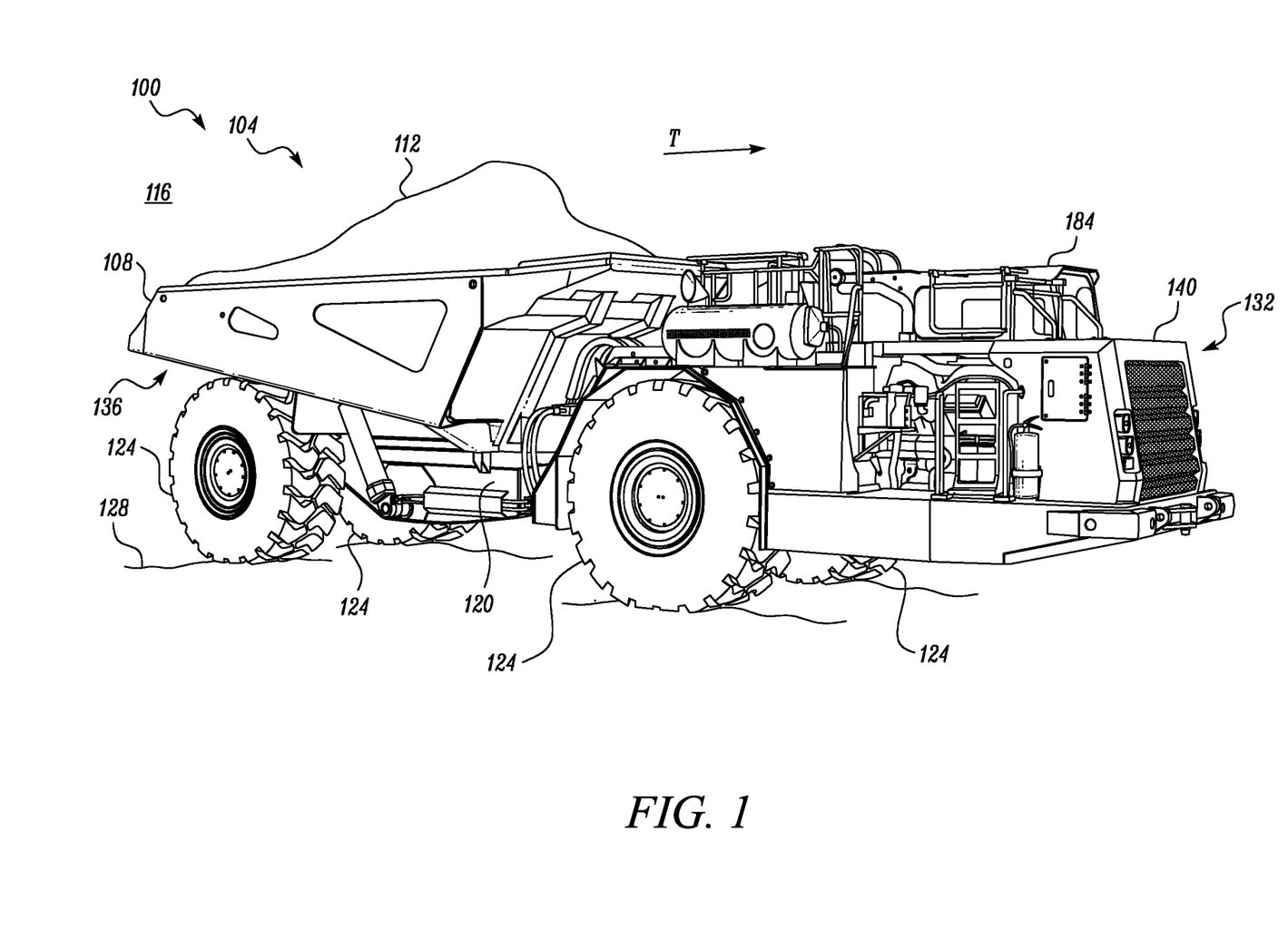
FIG. 1 is an exemplary machine, in accordance with an aspect of the present disclosure.

Referring to FIG. 1, an exemplary machine 100 is shown. The machine 100 may be a mobile machine and may exemplarily embody a dump truck 104, such as an articulated dump truck or an underground articulated dump truck, as shown. The machine 100 may include a dump body 108 within which a payload 112 may be received. The machine 100 may be employed at a worksite 116 (e.g., an underground mine site) where it may be required for such payload 112 to be transferred from one location to the other. The payload 112 may include ores and minerals. In one example, the machine 100 may receive the payload 112 into the dump body 108 from a load location. Thereafter, the machine 100 may travel up to a dump location, and release the payload 112 at the dump location, to accomplish payload transfer.

Although the above discussion, aspects of the present disclosure may be applied to several other machines having dump bodies. For example, aspects of the present disclosure also may be applicable to mining trucks, off-highway trucks, pick-up trucks, and similar machines, which, for example, may be applicable in areas where repeated back and forth movement is needed. One or more aspects of the present disclosure may also be applied to machines, such as wheel loaders. Accordingly, it may be understood that the aspects of the present disclosure are not limited to any particular machine type, and the reference to the machine 100, which is depicted and suggested above as an articulated dump truck or an underground articulated dump truck, is purely exemplary. Also, worksites where the machine 100 may be employed may include construction sites, mine sites, landfills, quarries, and the like, as well.

The machine 100 may include a frame 120. The frame 120 may include a rigid structure to which nearly every other component (and/or sub-component) of the machine 100 may be coupled to. Further, the machine 100 may include one or more traction devices 124. Said traction devices 124 may be either in the form of wheels, crawlers, or a combination thereof. The traction devices 124 may be supported on the frame 120. A powering of the traction devices 124 may cause the frame 120 (and thus, the machine 100) to move over a ground surface 128. If the machine 100 were to include an articulated machine, such as an articulated dump truck, as noted above, the frame 120 may include a split frame configuration with a forward sub-frame portion and a rearward sub-frame portion (not explicitly shown or annotated), with the forward sub-frame portion being pivotably coupled to the rearward sub-frame portion by way of a hitch.

Further, the machine 100 may include a forward end 132 and a rearward end 136, as shown. It may be noted that the terms 'forward' and 'rearward', as used herein, in relation to the ends (i.e., the forward end 132 and the rearward end 136), and otherwise, are in relation to an exemplary direction of travel of the machine 100, as represented by arrow, T, in FIG. 1. Said direction of travel is exemplarily defined to extend from the rearward end 136 of the machine 100 towards the forward end 132 of the machine 100, as shown. Understandably, arrow, T, represents a forward direction of the machine 100.

Figure 2:
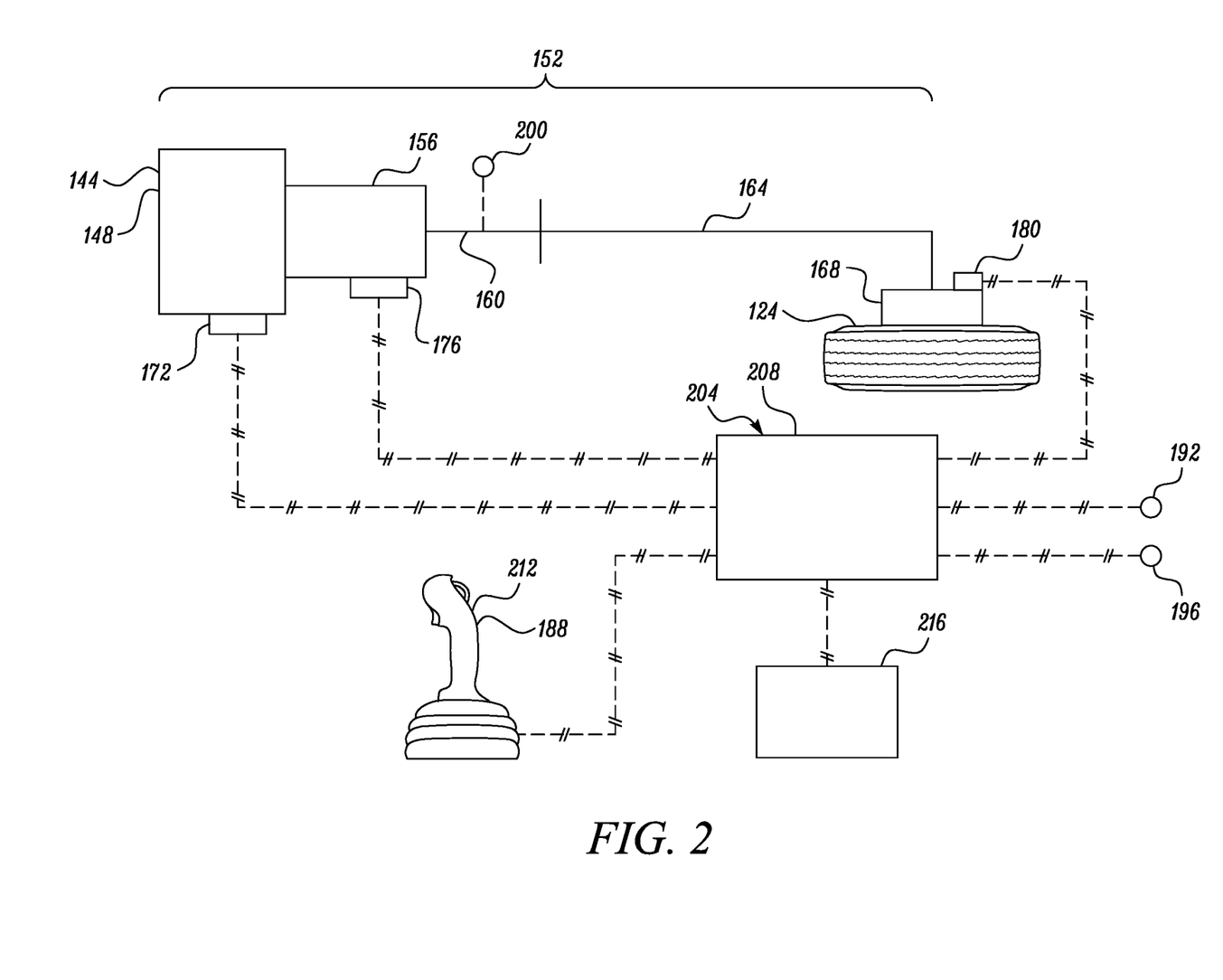
FIG. 2 is a schematic view of a powertrain of the machine depicted in conjunction with a control system and various other parts of the machine, in accordance with an aspect of the present disclosure.

Referring to FIGS. 1 and 2, the machine 100 may also include several other parts and sub-systems, such as a power compartment 140 that may be supported on the frame 120 and may house a power source 144 (see FIG. 2) of the machine. The power source 144 may include an internal combustion engine (or simply an engine 148, hereinafter) for generating power to run the various functions associated with the machine 100. For example, the engine 148 may be part of a powertrain 152 of the machine 100 and may be operably coupled to the traction devices 124 through various other parts of the powertrain 152 in order to power a working of the traction devices 124 and enable the machine 100 attain motion over the ground surface 128. The engine 148 may run on a fuel, such as diesel, gasoline, or natural gas, that may be employed either alone or in combination in the engine 148. Various discussions in the present disclosure reference the engine 148 and its associated components, but all such references related to the engine 148 may be viewed as exemplary, since it is possible for the power source 144 to include suitable equivalents or other types of power generation devices, such as a hybrid power generation device or an electric power generation device (e.g., that uses a battery), as well.

The machine 100 may also include a transmission 156 as part of the powertrain 152. The transmission 156 facilitates regulation and transfer of power generated by the engine 148 all the way to the traction devices 124 of the machine 100. Like the power source 144, the transmission 156 may be supported on the frame 120, as well. The transmission 156 may define multiple distinct gear ranges that may enable the machine 100 attain motion in both the forward direction (arrow, T) and reverse direction.

The transmission 156 may be adapted to be operably coupled to the power source 144 (e.g., engine 148) to receive power from the power source 144 (e.g., engine 148). Such coupling may be exemplarily attained by selective use of one or more clutches, such as a forward travel clutch and a reverse travel clutch (not shown). As an example, if motion in the forward direction (arrow, T) were required, the forward travel clutch may be engaged to bring an input shaft (not shown) of the transmission 156 in operable engagement with an output (e.g., a flywheel) of the engine 148 so that the machine 100 may attain said motion in the forward direction (arrow, T), while if a motion in the reverse direction were required, the reverse travel clutch may be engaged to bring said input shaft in operable engagement with said output of the engine 148 so that the machine 100 may attain said motion in the reverse direction.

Further, the transmission 156 may also include a transmission output shaft 160 through which power output (e.g., rotary power output) received from the power source 144 (e.g., engine 148) may be delivered to further components of the powertrain 152. For example, such power output may be delivered to a propeller shaft 164 of the powertrain 152, that may then further deliver the power output to the traction devices 124 to facilitate machine motion. It will be appreciated that transmission types apart from the one discussed herein may be contemplated. For example, a hydraulic or hybrid transmission may be used, if desired. Further, a layout of the powertrain 152, as illustrated in FIG. 2 and described here is exemplary, as well.

Further, the machine 100 may include a brake unit 168. The brake unit 168 may be configured to apply braking force against the traction devices 124 to retard the working or running of the traction devices 124, and, thus, retard machine motion as and when required. The brake unit 168 may be a hydraulic wheel brake associated with the traction devices 124. That is, the brake unit 168 may be supplied with pressure that may function to generate friction on a friction material (not shown) inside the brake unit 168 to slow the rotation and movement of the traction devices 124. In some instances, the braking force may be the result of a hydraulic pressure applied on to the friction material. In other instances, the braking force may be the result of a spring force. Other configurations may also exist, and the brake unit 168 may take any form known in the art. For example, the brake unit 168 may be an external dry brake, an internal wet brake, and/or the like.

In some embodiments, each of the power source 144, the transmission 156, and the brake unit 168 may include respective Electronic Control Modules (i.e., ECMs). For example, the power source 144, when including the engine 148, may include an engine ECM 172, the transmission 156 may include a transmission ECM 176, and the brake unit 168 may include a brake ECM 180. The engine ECM 172, among other engine related functions, may be configured to regulate a supply of fuel into the engine 148 to power said engine 148; the transmission ECM 176, among other transmission related functions, may be configured to cause the transmission 156 to shift between various speeds to cause the machine 100 to acquire different speeds and/or to cause the machine 100 to attain motion in different (i.e., forward or reverse) directions; and the brake ECM 180, among other brake related functions, may be configured to increase or decrease a braking force of the brake unit 168 to retard machine motion. In some embodiments, one or more of the engine ECM 172, transmission ECM 176, and the brake ECM 180, may be all integrated together into a unitary ECM.

Further, with continued reference to both FIGS. 1 and 2, the machine 100 may include an operator cab 184 mounted atop the frame 120. The operator cab 184 may facilitate accommodation and stationing of one or more operators of the machine 100 therein. The operator cab 184 may include various controls and operator interfaces in the form of displays, levers, touchscreen, control panels, joysticks (see joystick 188, FIG. 2), and the like, an access to which may enable one or more of the operators of the machine 100 to feed requests or input so as to control the many functions of the machine 100. For example, the operators may control operations of the power source 144, the transmission 156, and the brake unit 168, by way of access to such controls, so as to in turn facilitate and control machine motion. For example, by access to such controls (e.g., the joystick 188), one or more operators may request for a directional shift (i.e., forward-to-reverse or reverse-to-forward) of the transmission 156. Although various controls (e.g., the joystick 188) have been discussed to be housed within the operator cab 184, optionally, or additionally, such controls may be situated remotely to the machine 100, as well.

Moreover, the machine 100 may also include various sensors. For example, the machine 100 may include an inclination sensor 192 that may detect an angle of inclination of the machine 100 and a weight sensor 196 that may detect a weight of the payload 112 carried by the machine 100 (i.e., carried by the dump body 108 of the machine 100). Further, the machine 100 may also include a speed sensor 200 that may facilitate detection of a ground speed of the machine 100. For example, the speed sensor 200 may be configured to detect a speed (e.g., a rotary speed in rotations per minute, RPM) of the transmission output shaft 160, based on which a ground speed of the machine 100 may be deduced (e.g., in real time). Said speed sensor 200 may be communicably coupled to the transmission ECM 176 such that data from the speed sensor 200 may be received by the transmission ECM 176 for processing, storing, etc.

One or more aspects of the present disclosure relates to a control system 204 of the machine 100 that shifts the transmission 156 during machine motion without violating energy limitations of the various components of the powertrain 152. According to an example, the shift may be between a first speed of the transmission and a second speed of the transmission—e.g., in the first speed, the machine 100 moves in the forward direction, while, in the second speed, the machine 100 moves in the reverse direction). In other words, the shift in the transmission 156 that is brought about by the control system 204 may be a directional shift of the transmission 156 that, in turn, may result in a directional shift of the machine 100 (i.e., change in a travel direction of the machine 100), during machine motion.

To this end, the control system 204 includes a controller 208 that may control a working of the engine 148 and the brake unit 168 in a manner that may help the transmission 156 attain the directional shift, and, in turn, may enable the machine 100 attain the directional shift, without straining the components of the powertrain 152. In other words, the controller 208 controls a working of each of the engine 148 and the brake unit 168 such that in response to a request for the directional shift, a speed of the machine 100 is appropriately controlled (e.g., reduced), and at which time the directional shift of the transmission 156 may be smoothly executed. Aspects related to the controller 208 shall be discussed further below.

The controller 208 may be communicably coupled to the ECMs of each of the engine 148, the transmission 156, and the brake unit 168 (e.g., wirelessly or through suitable data links). For example, the controller 208 may be communicably coupled to the engine ECM 172, the transmission ECM 176, and the brake ECM 180. According to one embodiment of the present disclosure, the controller 208 may function in a closed loop manner with respect to one or more of the engine ECM 172, the transmission ECM 176, and the brake ECM 180, may dynamically (e.g., in real time) receive error signals associated with machine motion, and may provide corrective instructions to one or more of the engine 148, the transmission 156, and the brake unit 168, correspondingly through their respective ECMs, such that machine motion may be appropriately controlled and corrected, if required.

The controller 208 may also be communicably coupled to the sensors (i.e., the inclination sensor 192 and the weight sensor 196) discussed above. The controller 208 may be configured to receive data and/or signals from the inclination sensor 192 indicative of an angle of inclination of the machine 100 with respect to a datum or a reference (e.g., the horizontal or the vertical). According to an example, data and/or signals corresponding to the angle of inclination, as received by the controller 208, may be determined by the controller 208 to include either a positive value or a negative value. The controller 208 may consider any negative value of the angle of inclination to correspond to an angle attained by the machine 100 when the machine 100 is moving downhill at the worksite 116, and may conversely consider any positive value of the angle of inclination to correspond to an angle attained by the machine 100 when the machine 100 is moving uphill at the worksite 116.

Further, the controller 208 may also be communicably coupled to the weight sensor 196 and may be configured to receive data and/or signals from the weight sensor 196 that are indicative of the weight of the payload 112. According to an example, the controller 208 may process the signals received from the weight sensor 196 and may determine the weight of the payload 112 in terms of percentage (%). As an example, 0% may correspond to a minimum weight (or a negligible weight) of the payload 112, while 100% may correspond to a maximum weight of the payload 112. In some embodiments, the weight sensor 196 may not be directly communicably coupled to the controller 208. Instead, the weight sensor 196 may be communicably coupled to a different ECM (e.g., to one of the aforesaid ECMs) such that the weight of the payload 112 may be processed by such an ECM and a final weight may be distributed to one or more of the ECMs (e.g., the transmission ECM 176) and/or to the controller 208.

Furthermore, the controller 208 may be communicably coupled to one or more of the controls (e.g., the joystick 188). According to an aspect of the present disclosure, the joystick 188 may be an input device 212, access to and/or manipulation of which facilitates the feeding of the input or the request for the directional shift of the transmission 156. Additionally, the controller 208 may be coupled to a memory unit 216, which may store various/multiple sets of instructions, from which one or more sets of instruction may be accessed and run by the controller 208. In so doing, the controller 208 may control a working of each of the engine 148 and the brake unit 168 by way of a scheme through which a speed of the machine 100 may be appropriately reduced, and so that the directional shift of the transmission 156 may be smoothly executed. A detailed working of the controller 208 by way of the scheme, with some examples, have been set out later in the disclosure.

The controller 208 may be integrated and/or connected to any of the machine's module, such as a safety module or a dynamics module, or may be configured as a stand-alone entity. Optionally, the controller 208 may be integral and be one and the same as any one of the several aforementioned ECMs of the machine 100, as discussed above. In some embodiments, the ECMs (i.e., the engine ECM 172, transmission ECM 176, and the brake ECM 180) may be integrated together into a single control module entity to define the controller 208. Alternatively, the controller 208 may form part of one or more of the aforesaid ECMs, although it is possible for the controller 208 to stand alone and separate as an altogether different entity.

Exemplarily, the controller 208 may be a microprocessor-based device, and/or may be envisioned as an application-specific integrated circuit, or other logic devices, which provide controller functionality, with such devices being known to those with ordinary skill in the art. In one example, it is possible for the controller 208 to include or be representative of one or more controllers having separate or integrally configured processing units to process a variety of data (or input). Further, the controller 208 may be optimally suited for accommodation within certain machine panels or portions from where the controller 208 may remain accessible for ease of use, service, calibration, and repairs.

In some cases, the controller 208 may be hard-wired to the joystick 188, and to various other components and devices, associated with the machine 100, such as to the ECMs (i.e., the engine ECM 172, transmission ECM 176, and the brake ECM 180) and to the sensors (i.e., the inclination sensor 192 and weight sensor 196) of the machine 100. Optionally, the controller 208 may also be deployed at a remote site either in proximity to the joystick 188 or away from the joystick 188.

Processing units, to convert and/or process the signals/data from the joystick 188, the inclination sensor 192, the weight sensor 196, the speed sensor 200, etc., may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory unit 216 may include a hard disk drive (HDD), and a secure digital (SD) card. Further, the memory unit 216 may include non-volatile/volatile memory units such as a random-access memory (RAM)/a read only memory (ROM), which include associated input and output buses. The memory unit 216 may be configured to store the set of instructions that may be executable by the controller 208 to execute a method for shifting the transmission 156, as has been discussed in the present disclosure.

INDUSTRIAL APPLICABILITY

During operation, as the machine 100 may repeatedly move back and forth between various locations (e.g., load locations and dump locations) of the worksite 116, an operator(s) of the machine 100 may regularly/repeatedly require the machine 100 to shift travel directions. Owing to spatial constraints of the worksite 116, stringent time schedules, etc., it may be cumbersome and time consuming for the machine 100 to change its orientation each time a change in the travel direction is needed. To move back and forth and for accomplishing various other work related tasks, it is therefore common for operators of the machine 100 to request for a directional shift of the transmission 156, such that, for example, the machine 100 travelling in one direction may be switched for a travel in an opposite direction, without changing its orientation. Depending upon a busy and/or production intensive worksite, the frequency of such directional shifts may be relatively higher.

The control system 204 of the present disclosure facilitates a control over the working of the engine 148 and the brake unit 168 that helps attain the directional shift in the transmission 156 (and the machine 100) without unduly straining the powertrain components of the machine 100. In other words, the controller 208 controls a working of each of the engine 148 and the brake unit 168 such that a speed of the machine 100 is appropriately reduced and slowed down, at which point, the directional shift of the transmission 156 (and thus of the machine 100) may be smoothly executed.

Figure 3:
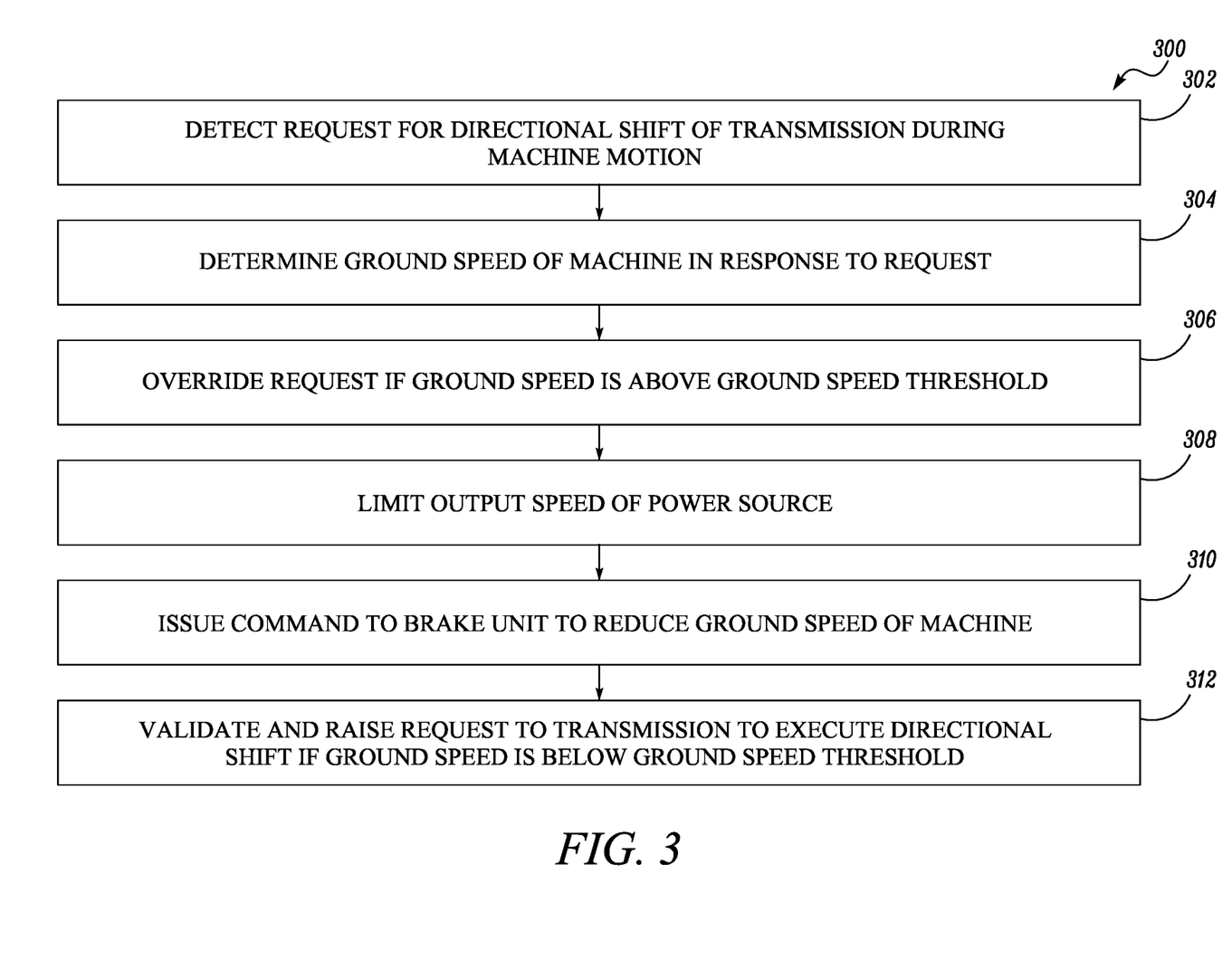
FIG. 3 is a flowchart illustrating a method for shifting a transmission in the machine, in accordance with an aspect of the present disclosure.

Referring to FIG. 3, an operation of the control system 204 for shifting the transmission 156 in the machine 100 has been explained by way of an exemplary method. Said method is illustrated and discussed by way of a flowchart 300 as shown in FIG. 3, and is discussed also in conjunction with FIGS. 1 and 2. The method starts at step 302.

At step 302, as the machine 100 may move over the ground surface 128, an operator of the machine 100 (either situated within the operator cab 184 or remotely to the machine 100) may request for a directional shift of the transmission 156 (and thus the machine 100). Said request may be fed through the input device 212 (e.g., the joystick 188). Since the controller 208 may be in operable communication with the input device 212, the controller 208 may detect such a request. In response to the detection of the request for the directional shift of the transmission 156, the controller 208 may retrieve a set of instruction from the memory unit 216. Once the set of instruction is retrieved, the controller 208 may run the set of instructions. In pursuance to running of the set of instructions, the controller 208 may instruct the engine ECM 172 and the brake ECM 180 to function according to a scheme set forth by the set of instructions. The method proceeds to step 304.

At step 304, in response to the request, the controller 208 may determine a ground speed of the machine 100. In this regard, the controller 208 may retrieve data related to a speed (e.g., a rotary speed) of the transmission output shaft 160 either from the speed sensor 200 or from the transmission ECM 176 that may be in communication with the speed sensor 200. Based on the speed of the transmission output shaft 160, as retrieved, the controller 208 may further determine (e.g., by using suitable equations) a ground speed of the machine 100 (i.e., a speed at which the machine 100 may move relative to the ground surface 128). Said manner of determining the ground speed of the machine 100 from the speed of the transmission output shaft 160, i.e., through the use of suitable equations, etc., may be contemplated by someone in the art, and, thus, will not be discussed.

In some embodiments, and as part of step 304, the controller 208 may compare the ground speed to a first speed threshold and may ascertain machine motion if the determined ground speed were to exceed the first speed threshold, and may accordingly determine that the request was received during machine motion (i.e., when the machine 100 is moving with respect to the ground surface 128). Further, given that the controller 208 needs to facilitate the shift (i.e., the directional shift) of transmission 156 in response to the request, the controller 208 may also compare the ground speed of the machine 100 with respect to a second speed threshold (referred to as ground speed threshold, hereinafter). If the ground speed were determined to be below the ground speed threshold, the controller 208 may instruct the transmission 156 (e.g., by way of the transmission ECM 176) to execute the shift (i.e., the directional shift) right away. The method proceeds to step 306.

At step 306, if the ground speed were determined to be above the ground speed threshold, the controller 208 may override the request. Such overriding of the request is performed since executing the directional shift of the transmission 156 during a relatively high ground speed may unduly strain the many components of the powertrain 152, violating their energy limitations. The method proceeds to step 308.

At steps 308 and 310, once the request is overridden, the controller 208 may prepare the machine 100 for the directional shift. According to an exemplary aspect of the present disclosure, preparing the machine 100 for the directional shift includes limiting an output speed of the power source 144 or of the engine 148 (i.e., step 308) and issuing a command (c) to the brake unit 168 to reduce the ground speed of the machine 100 (i.e., step 310) such that the ground speed could be brought below the ground speed threshold. Description further below includes exemplary discussions related to limiting the output speed of the engine 148 and to the issuing of the command (c) to the brake unit 168 to reduce the ground speed of the machine 100.

At step 308, with regard to limiting the output speed of the engine 148, the controller 208 may detect the output speed of the engine 148 (e.g., by communication with the engine ECM 172). Although not limited, this output speed of the engine 148 may correspond to a rotary speed (e.g., in RPM) of a flywheel (not shown) associated with the engine 148. In some cases, said output speed of the engine 148 may be sensed by a suitable sensor (not shown) operably coupled to the flywheel of the engine 148, and, said sensed output speed of the engine 148 may be retrieved by the engine ECM 172 in regular intervals, and which may be in turn retrieved by the controller 208, as and when required or as and when the request for the directional shift is detected. Once the output speed of the engine 148 is detected by the controller 208 (e.g., by communication with the engine ECM 172), the controller 208 may compare said output speed of the engine 148 to a power source speed threshold (e.g., an engine speed threshold).

Based on the comparison, the controller 208 may determine if the output speed of the engine 148 were above or below the engine speed threshold. If the output speed of the engine 148 is determined to be above or higher in comparison to the engine speed threshold, the controller 208 may instruct the engine 148 (e.g., by way of the engine ECM 172) to reduce a supply of fuel into the engine 148 such that the speed of the engine 148 may fall and be brought below the engine speed threshold. Alternatively, if the output speed of the engine 148 is determined to be below the engine speed threshold, the controller 208 may instruct the engine (e.g., by way of the engine ECM 172 or the transmission ECM 176) to restrict the quantity of fuel supply to a level such that the output speed of the engine 148 may refrain from exceeding beyond the engine speed threshold. In other words, if the output speed of the engine 148 is already below an engine speed threshold (i.e., under an acceptable RPM), a further reduction in the output speed of the engine (e.g., by releasing a throttle of the engine 148) may not be required to prepare for the directional shift.

In some embodiments, where the power source 144 may include an electric motor (e.g., a battery powered electric motor), the controller 208 may limit an output speed of such an electric motor by issuing appropriate commands to the electric motor, or by issuing appropriate commands to an ECM associated with the electric motor. Such commands and the manner of controlling the electric motor may remain similar to what has been discussed above with regard to the engine 148. As an example, the controller 208 may regulate a power supply to the electric motor such that an output speed of the electric motor may remain limited to within a threshold (e.g., a corresponding power source speed threshold). The method proceeds to step 310.

At step 310, with regard to issuing the command (c) to the brake unit 168 to reduce the ground speed of the machine 100 and to prepare for the directional shift of the transmission 156, the controller 208 may consider the determined ground speed of the machine 100 to be an actual ground speed of the machine 100. Further, the controller 208 may compare the actual ground speed of the machine 100 to a target ground speed of the machine 100. According to an example, the controller 208 may receive the target ground speed from the transmission ECM 176 and/or the engine ECM 172. Based on the comparison between the actual ground speed and the target ground speed, the controller 208 may deduce a difference between the actual ground speed and the target ground speed and determine a corresponding speed error signal (e).

The controller 208 may process the speed error signal (e) to generate and issue the command (c) to the brake unit 168 to ensure that the brake unit 168 responds accurately and appropriately in preparation for the directional shift. To this end, the controller 208 may embody and/or include a PI (proportional-integral) controller function that may convert the speed error signal (e) into a proportional component and an integral component. Said components of the speed error signal (e) may be obtained by the controller 208 by suitably scaling the speed error signal (e). In one example, the proportional component may be a proportionally scaled error signal, Kp, while the integral component may be an integrally scaled error signal, Ki.

In further detail, said components (i.e., the proportionally scaled error signal, Kp, and the integrally scaled error signal, Ki) may each correspond to a respective gain. More particularly, scaling the speed error signal (e) to arrive at the proportionally scaled error signal, Kp, may include obtaining a product of the speed error signal (e) and a proportional gain, Kg, associated with the speed error signal (e). See the following equation [1]:

$$Kp = e \cdot Kg$$

Similarly, scaling the speed error signal (e) to arrive at the integrally scaled error signal, Ki, may include obtaining an integral of a product of the speed error signal (e) and an integral gain, Kg', associated with the speed error signal (e). See the following equation [2]:

$$Ki = \int e \cdot Kg' \cdot dt$$

To arrive at the command (c), the controller 208 may summate the proportionally scaled error signal, Kp, with the integrally scaled error signal, Ki. See the following equation [3]:

$$c = Ki + Kp$$

According to one or more aspects of the present disclosure, the controller 208 may take into account one or both the weight of the payload 112 carried by the machine 100 and an angle of inclination of the machine 100 when the issuing the command. In other words, the command (c) issued to the brake unit 168 may correspond to a variable braking force. This is because an increase in weight of the machine 100 (owing to a weight of the payload 112 in excess to a weight of the machine 100) may mean that a (proportionally) higher amount of braking force may be required to retard and lower the speed of the machine 100 for attaining the directional shift. Similarly, if the machine 100 is on an incline, e.g.,—if the machine 100 is travelling downhill, a relatively higher amount of braking force may be required to retard and lower the speed of the machine 100 (for attaining the directional shift) than an amount of braking force that would be required were the machine 100 moving on flat ground, and, conversely, if the machine 100 is travelling uphill, a lesser amount of braking force may be required to retard and lower the speed of the machine (for attaining the directional shift) than an amount of braking force that would be required were the machine 100 moving on flat ground.

To account for the weight of the payload 112 and the angle of inclination of the machine 100, as an example, the controller 208 may modify the proportionally scaled error signal, Kp. For example, the controller 208 may determine the product of the speed error signal (e) and the proportional gain, Kg, and may designate said product as a first value. See the following equation [4]:

$$\text{first value } (Fv) = e \cdot Kg$$

Further, the controller 208 may receive data indicating the angle of inclination of the machine 100, and while scaling the speed error signal (e) to arrive at the proportionally scaled error signal, Kp, the controller 208 may also obtain a product of the speed error signal (e) and a gain, Ka, associated with the angle of inclination. Said product of the speed error signal (e) and the gain, Ka, associated with the angle of inclination may result in the computation of a second value. See the following equation [5]:

$$\text{second value } (Sv) = e \cdot Ka$$

Furthermore, the controller 208 may receive data indicating a weight of a payload 112 carried by the machine 100, and while scaling the speed error signal (e) to arrive at the proportionally scaled error signal, Kp, the controller 208 may further obtain a product of the speed error signal (e) and a gain, Kw, associated with the weight of the payload 112, as well. Said product of the speed error signal (e) and the gain, Kw, associated with the weight of the payload 112 may result in the computation of a third value. See the following equation [6]:

$$\text{third value } (Tv) = e \cdot Kw$$

According to an exemplary embodiment, scaling the speed error signal to arrive at the proportional component or the proportionally scaled error signal, Kp, includes adding together the first value, the second value, and the third value. See the following equation [7]:

$$Kp = Fv + Sv + Tv$$

For simplicity, the above equation [7] may also be iterated differently and may be understood from the following equation [8]:

$$Kp = e \cdot (Kg + Ka + Kw)$$

A functioning of the controller 208 associated with arriving at the proportionally scaled error signal, Kp, by determination and/or deduction of the gains Kg, Ka, and Kw, as aforementioned, are exemplified by way of a couple of examples further below. For understanding the examples, the proportional gain (Kg) may be considered to include a predetermined value (e.g., a first predetermined value). Further, the gain, Ka, associated with the angle of inclination of the machine 100 may be obtained as a product of a predetermined value (e.g., a second predetermined value) and the angle of inclination as obtained by the controller 208, and, similarly, the gain, Kw, associated with the weight of the payload 112 may be obtained as a product of a predetermined value (e.g., a third predetermined value) and the weight of the payload 112 (in percentage) as obtained by the controller 208. For each of the examples discussed below, the first predetermined value may be 0.5; the second predetermined value may be −0.01; and the third predetermined value may be 0.002.

With regard to a first example, it will be assumed that the dump body 108 of the machine 100 is empty (i.e., there is no weight of the payload 112), and the machine 100 may travel on level/flat ground. Accordingly, the following may be considered:

$$Kg = 0.5; \; Ka = -0.01 * 0 \text{ degrees}; \; Kw = 0.002 * 0\% \text{ payload}$$

In light of the above exemplarily assigned values, equation [8] may be iterated and processed as below:

$$wKp = e \cdot (0.5 - 0.01 * 0 \text{ degrees} + 0.002 * 0\% \text{ payload})$$

$$Kp = e \cdot (0.5 - 0 + 0)$$

$$Kp = e * 0.5$$

With regard to a second example, it will be assumed that the dump body 108 of the machine 100 is empty (i.e., there is no weight of the payload 112), and the machine 100 is traveling uphill on a 5 degree grade. Accordingly, the following may be considered:

$$Kg = 0.5; \; Ka = -0.01 * 5 \text{ degrees}; \; Kw = 0.002 * 0\% \text{ payload}$$

In light of the above exemplarily assigned values, equation [8] may be iterated and processed as below:

$$Kp = e \cdot (0.5 - 0.01 * 5 \text{ degrees} + 0.002 * 0\% \text{ payload})$$

$$Kp = e \cdot (0.5 - 0.05 + 0)$$

$$Kp = e * 0.45$$

With regard to a third example, it will be assumed that the dump body 108 of the machine 100 is full (i.e., there is 100% weight of the payload 112), and the machine 100 is traveling downhill on a 10 degree grade. Accordingly, the following may be considered:

$$Kg = 0.5; \; Ka = -0.01 * (-10) \text{ degrees}; \; Kw = 0.002 * 100\% \text{ payload}$$

In light of the above exemplarily assigned values, equation [8] may be iterated and processed as below:

$$Kp = e \cdot (0.5 - 0.01 \ast (-10) \text{ degrees} + 0.002 \ast 100\% \text{ payload})$$

$$Kp = e \cdot (0.5 + 0.1 + 0.2)$$

$$Kp = e \ast 0.8$$

Similar such examples may be contemplated. Additionally, in some embodiments, a similar discussion may be contemplated with regard to the integrally scaled error signal, Ki, as well. For example, to account for the weight of the payload 112 and the angle of inclination of the machine 100, as an example, the controller 208 may modify the integrally scaled error signal, Ki, as well. In this regard, the controller 208 may use the following equation [9]:

$$Ki = \int e \cdot (Kg' + Ka' + Kw') \cdot dt$$

where, Ka' and Kw' may be considered as corresponding equivalents of the gains Ka and Kw, applied in equation [8]. Although, Kg', Ka', and Kw', may respectively differ from Kg, Ka, and Kw, they may respectively be the same and/or respectively be equal in certain cases.

Once both the proportionally scaled error signal, Kp, and the integrally scaled error signal, Ki, are obtained, as has been noted above, the controller 208 may summate the two (i.e., the proportionally scaled error signal, Kp, and the integrally scaled error signal, Ki) and may arrive at the command (c) to be issued to the brake unit 168 or to the brake ECM 180 such that the brake ECM 180 may in turn issue the command (c) to the brake unit 168—see equation [3]. The method proceeds to step 312.

At step 312, in pursuance to the controller 208 limiting the output speed of the engine 148 and issuing the command (c) to the brake unit 168, as the ground speed of the machine 100 is brought under the ground speed threshold, the controller 208 may validate and raise the request to the transmission 156, or to the transmission ECM 176 that in turn may raise the request to the transmission 156, to execute the directional shift. In some embodiments, executing the directional shift of the transmission 156 includes selectively causing disengagement of one of the forward travel clutch and reverse travel clutch and engagement of the other of the forward travel clutch and reverse travel clutch, associated with the powertrain 152 of the machine 100.

Because the control system 204 facilitates a control over the working of the engine 148 and the brake unit 168, as aforementioned, the machine 100 is sufficiently slowed down for directional shifts to be smoothly executed. This ensures negligible dissipation of undue strain and momentum to the powertrain components. In brevity, a directional shift as obtained through the aforementioned method may result in smooth directional shifts with minimal component wear and shock-loading. As a result, various parts of the machine 100 (e.g., the powertrain 152 and its components) age well and last longer.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for shifting a transmission in a machine, the method comprising:
    detecting, by a controller, a request for a directional shift of the transmission;
    determining, by the controller, a ground speed of the machine in response to the request;
    overriding, by the controller, the request if the ground speed is above a ground speed threshold;
    preparing, by the controller, the machine for the directional shift by:
        limiting an output speed of a power source of the machine; and
        issuing a command to a brake unit of the machine to reduce the ground speed of the machine; and
    validating and raising, by the controller, the request to the transmission to execute the directional shift if the ground speed is below the ground speed threshold,
        wherein the power source includes an internal combustion engine, and limiting the output speed of the power source includes:
        detecting, by the controller, the output speed of the internal combustion engine;
        comparing, by the controller, the output speed of the internal combustion engine to an engine speed threshold; and
        reducing, by the controller, a supply of fuel into the internal combustion engine if the output speed of the internal combustion engine is above the engine speed threshold.

2. The method of claim 1, wherein issuing the command includes:
    determining a speed error signal by comparing and deducing a difference between an actual ground speed of the machine and a target ground speed of the machine;
    scaling the speed error signal to respectively arrive at a proportionally scaled error signal and an integrally scaled error signal; and
    summating the proportionally scaled error signal with the integrally scaled error signal to arrive at the command.

3. The method of claim 2, wherein:
    scaling the speed error signal to arrive at the integrally scaled error signal includes obtaining an integral of a product of the speed error signal and an integral gain associated with the speed error signal.

4. The method of claim 2, wherein:
    scaling the speed error signal to arrive at the proportionally scaled error signal includes obtaining a product of the speed error signal and a proportional gain associated with the speed error signal to arrive at a first value.

5. The method of claim 4 further comprising:
    receiving, by the controller, data indicating an angle of inclination of the machine, wherein:
        scaling the speed error signal to arrive at the proportionally scaled error signal includes obtaining a product of the speed error signal and a gain associated with the angle of inclination to arrive at a second value.

6. The method of claim 5 further comprising:
    receiving, by the controller, data indicating a weight of a payload carried by the machine, wherein:
        scaling the speed error signal to arrive at the proportionally scaled error signal includes obtaining a product of the speed error signal and a gain associated with the weight of the payload to arrive at a third value.

7. The method of claim 6, wherein scaling the speed error signal to arrive at the proportionally scaled error signal includes adding together the first value, the second value, and the third value.

8. A machine, comprising:
a power source to generate power;
a transmission operably coupled to the power source to receive power from the power source and transfer the power to one or more traction devices of the machine to facilitate machine motion;
a brake unit to apply braking force against the one or more traction devices to retard machine motion;
a control system for shifting the transmission, the control system including:
a controller configured to:
detect a request for a directional shift of the transmission;
determine a ground speed of the machine in response to the request;
override the request if the ground speed is above a ground speed threshold;
prepare the machine for the directional shift by:
limiting an output speed of the power source; and
issuing a command to the brake unit to reduce the ground speed of the machine; and
validate and raise the request to the transmission to execute the directional shift if the ground speed is below the ground speed threshold,
wherein the power source includes an internal combustion engine, and for limiting the output speed of the power source the controller is configured to:
detect the output speed of the internal combustion engine;
compare the output speed of the internal combustion engine to an engine speed threshold; and
reduce a supply of fuel into the internal combustion engine if the output speed of the internal combustion engine is above the engine speed threshold.

9. The machine of claim 8, wherein to issue the command, the controller is configured to:
determine a speed error signal by comparing and deducing a difference between an actual ground speed of the machine and a target ground speed of the machine;
scale the speed error signal to respectively arrive at a proportionally scaled error signal and an integrally scaled error signal; and
summate the proportionally scaled error signal with the integrally scaled error signal to arrive at the command.

10. The machine of claim 9, wherein to scale the speed error signal to arrive at the integrally scaled error signal, the controller is configured to obtain an integral of a product of the speed error signal and an integral gain associated with the speed error signal.

11. The machine of claim 9, wherein to scale the speed error signal to arrive at the proportionally scaled error signal, the controller is configured to obtain a product of the speed error signal and a proportional gain associated with the speed error signal to arrive at a first value.

12. The machine of claim 11, wherein the controller is configured to receive data indicating an angle of inclination of the machine, and wherein to scale the speed error signal to arrive at the proportionally scaled error signal, the controller is configured to obtain a product of the speed error signal and a gain associated with the angle of inclination to arrive at a second value.

13. The machine of claim 12, wherein the controller is configured to receive data indicating a weight of a payload carried by the machine, and wherein to scale the speed error signal to arrive at the proportionally scaled error signal, the controller is configured to obtain a product of the speed error signal and a gain associated with the weight of the payload to arrive at a third value.

14. The machine of claim 13, wherein to scale the speed error signal to arrive at the proportionally scaled error signal, the controller is configured to add together the first value, the second value, and the third value.

15. A control system for shifting a transmission in a machine, the control system comprising:
a controller configured to:
detect a request for a directional shift of the transmission;
determine a ground speed of the machine in response to the request;
override the request if the ground speed is above a ground speed threshold;
prepare the machine for the directional shift by:
limiting an output speed of a power source of the machine; and
issuing a command to a brake unit of the machine to reduce the ground speed of the machine; and
validate and raise the request to the transmission to execute the directional shift if the ground speed is below the ground speed threshold,
wherein to issue the command, the controller is configured to:
determine a speed error signal by comparing and deducing a difference between an actual ground speed of the machine and a target ground speed of the machine;
scale the speed error signal to respectively arrive at a proportionally scaled error signal and an integrally scaled error signal; and
summate the proportionally scaled error signal with the integrally scaled error signal to arrive at the command.

16. The control system of claim 15, wherein the power source includes an internal combustion engine, and for limiting the output speed of the power source the controller is configured to:
detect the output speed of the internal combustion engine;
compare the output speed of the internal combustion engine to an engine speed threshold; and
reduce a supply of fuel into the internal combustion engine if the output speed of the internal combustion engine is above the engine speed threshold.

17. The control system of claim 15, wherein the controller is configured to:
receive data indicating an angle of inclination of the machine;
receive data indicating a weight of a payload carried by the machine, and wherein to scale the speed error signal to arrive at the proportionally scaled error signal, the controller is configured to:
obtain a product of the speed error signal and a proportional gain associated with the speed error signal to arrive at a first value;
obtain a product of the speed error signal and a gain associated with the angle of inclination of the machine to arrive at a second value;

obtain a product of the speed error signal and a gain associated with the weight of the payload carried by the machine to arrive at a third value; and add together the first value, the second value, and the third value.

\* \* \* \* \*